Nov. 27, 1934.  E. G. BLACKWELL  1,982,413
CHARGING OF COAL, COKE, AND OTHER SOLID MATERIALS
INTO STORAGE CHAMBERS AND THE LIKE
Filed June 12, 1933  4 Sheets-Sheet 1

E. G. Blackwell
INVENTOR

By Marks & Clerk
ATTYS

Nov. 27, 1934. E. G. BLACKWELL 1,982,413
CHARGING OF COAL, COKE, AND OTHER SOLID MATERIALS
INTO STORAGE CHAMBERS AND THE LIKE
Filed June 12, 1933 4 Sheets-Sheet 2

E. G. Blackwell
INVENTOR
By Marks & Clerk
Attys.

Nov. 27, 1934. E. G. BLACKWELL 1,982,413
CHARGING OF COAL, COKE, AND OTHER SOLID MATERIALS
INTO STORAGE CHAMBERS AND THE LIKE
Filed June 12, 1933  4 Sheets-Sheet 3

E. G. Blackwell
INVENTOR

By: Marks & Clerk
Attys.

Patented Nov. 27, 1934

1,982,413

UNITED STATES PATENT OFFICE 1,982,413

CHARGING OF COAL, COKE, AND OTHER SOLID MATERIALS INTO STORAGE CHAMBERS AND THE LIKE

Edwin George Blackwell, Worcester, England

Application June 12, 1933, Serial No. 675,476
In Great Britain June 23, 1932

5 Claims. (Cl. 193—32)

This invention relates to the charging of coal, coke and other solid substances into storage chambers, hoppers, bins and other like receptacles, and has for its object to provide improved means whereby the charging operations can be carried out with a minimum of breakage or pulverization of the material. For this purpose it is already known to arrange within a receptacle one or a series of inclined chutes down which the material is caused to flow to avoid free falling and other conditions detrimental to the material.

The present invention comprises the combination with one or each end of a delivery chute, of a control device whereby a slow intermittent mass movement of the material down the delivery chute and into the storage receptacle is attained.

Also the invention comprises the combinations and arrangements of parts hereinafter described and claimed.

In the four accompanying sheets of explanatory drawings:—

Figure 14:
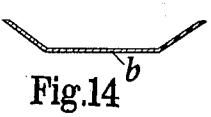
Figure 14 shows in cross section a modified form of chute.
Figure 4:
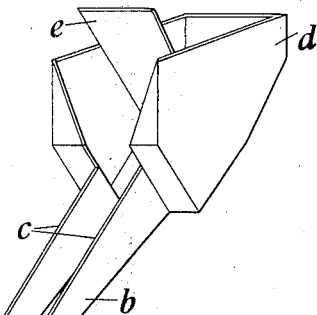
Figure 4 is a perspective view of the chute.
Figure 4:
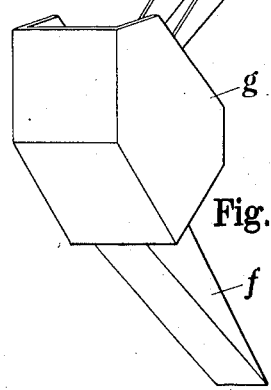
Figure 5:
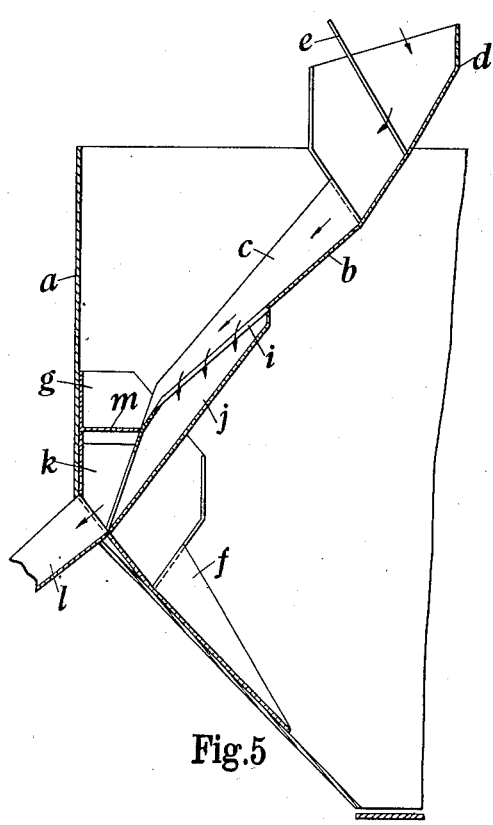
Figure 5 is a sectional side elevation, and Figure 6 a sectional front elevation showing a modified form of chute, Figure 7 being a sectional plan and Figure 8 a cross section of the lower part of the chute.
Figure 6:
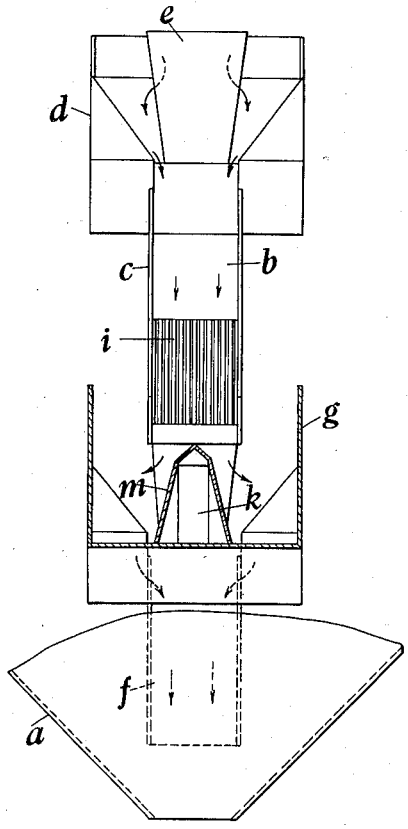
Figure 7:
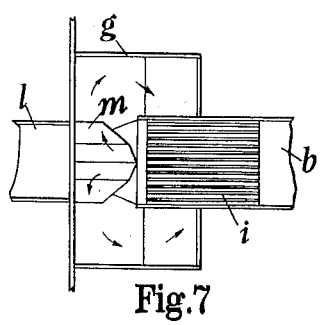
Figure 8:
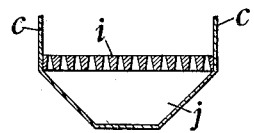

In applying the invention as shown in Figures 1–4 to the charging of coal, coke or the like into a storage chamber $a$ from the lower end of which the material can be withdrawn as required, I arrange at the upper end of the chamber, a chute $b$ having tapered sides $c$, which form with the base of the chute a channel of gradually dimininishing depth. This chute has its sides arranged at right angles to the base, but if desired the sides may be inclined to the base as shown in Figure 14. At the upper end of the chute is arranged a flow control device. This consists of a hopper $d$ which is open at its upper side and which has a V-shaped base. Within this hopper is placed an inclined midfeather plate $e$ which at its lower end forms another V with the base of the hopper. Preferably the side edges of the plate are tapered so that the gap provided between either edge of the plate and the adjacent side of the hopper is wider at the bottom than at the top. The material is fed into the upper V portion of the hopper in any convenient manner, such as by means of a tip wagon, or a conveyor. From here it flows as indicated by the arrows in Figure 2 around each side of the plate $e$ into the lower portion of the hopper, and thence it passes on to the chute $b$ which is narrower than the hopper and is placed centrally with respect thereto.

The effect of the control hopper is to prevent unimpeded flow of the material on to and down the chute. What actually occurs is that the material flows gently in a spiral manner from the upper V portion of the hopper to the lower V portion, and after reversal of direction it flows spirally on to the chute and thence to the lower control hopper where similar controlled movement takes place.

Figure 2:
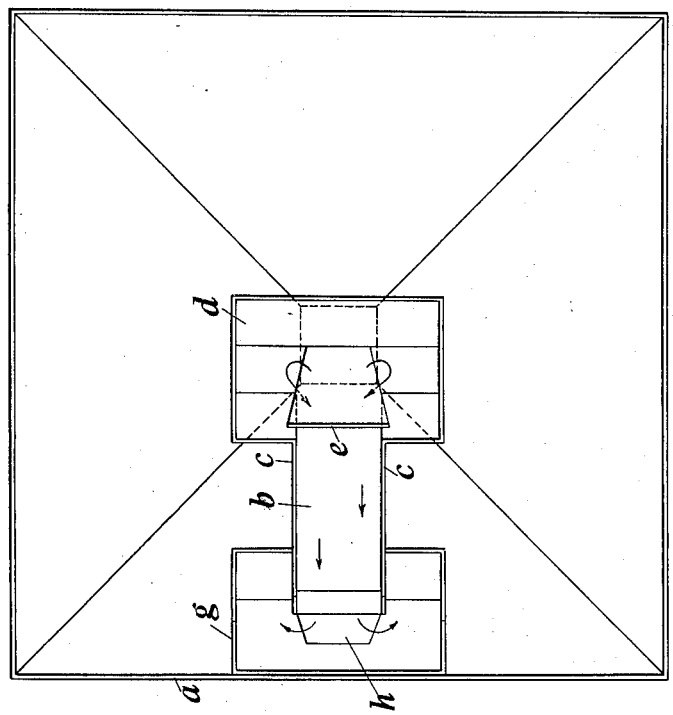
Figure 1:
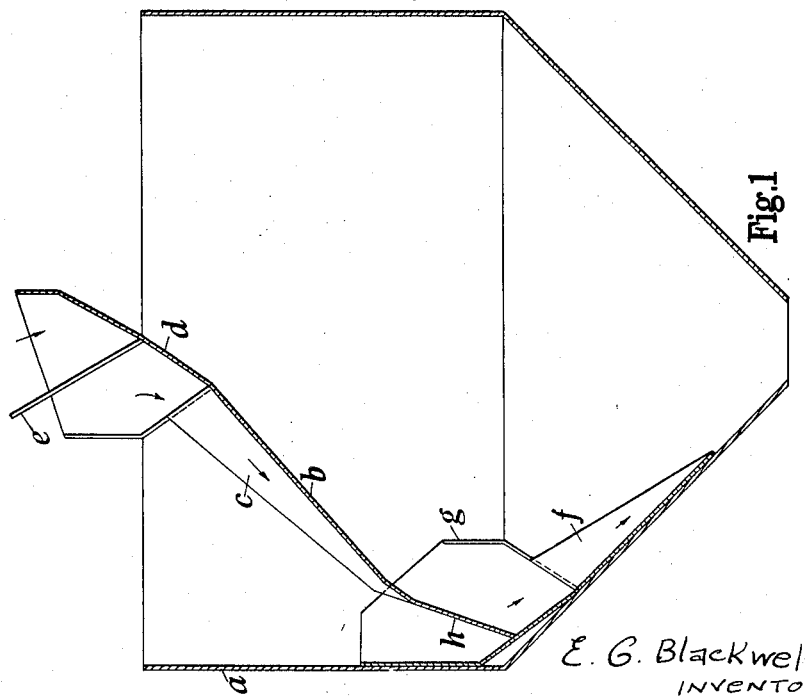
Figure 1 is a sectional side elevation, Figure 2 a plan, and Figure 3 a part sectional front elevation of a hopper charging chute constructed in accordance with this invention.
Figure 3:
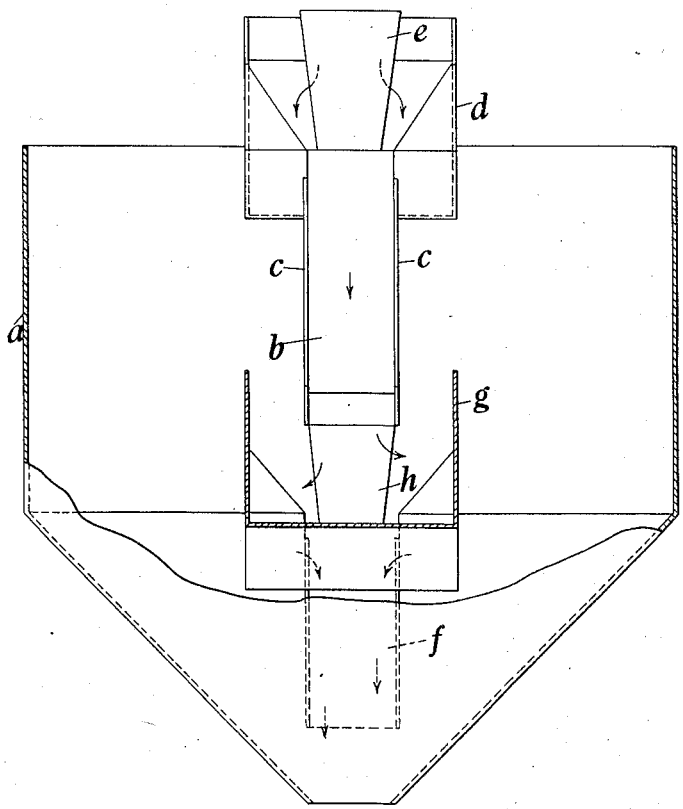

The material tends to accumulate on the chute until sufficient material has gathered on it to produce an avalanche effect, the mass of material on the chute then flowing slowly down it, leaving the upper part clear and permitting continued flow on to the chute from the upper hopper. I find that the desired avalanche effect is assisted by providing the chute with tapered sides as shown in Figure 1, the depth of the sides diminishing towards the lower end of the chute.

In the case of a deep storage chamber as shown, a plurality of chutes and control hoppers are employed. In the figures illustrated two chutes and control hoppers are shown, the lower chute being indicated by $f$. The lower end of the chute $b$ then delivers the material into the second control hopper $g$ at the upper end of the chute $f$ This lower control hopper is essentially similar to the upper one. It has a V shaped base, and an inclined midfeather plate $h$ (which latter may be formed by the lower end of the base of the chute $b$). After leaving the plate $h$ the material passes around each of its sides into the lower V portion of the hopper and thence on to the centrally arranged lower chute $f$. The action of the lower control hopper and chute is the same as that of the upper hopper and chute. The plate $h$ in addition to forming the partition of the control hopper also serves another important function. It will be noticed that it is inclined at a steeper angle than the chute $b$ which supplies it with material. By reason of this inclination risk of choking of the chute b by material lodging on it is minimized, as the steepness of the plate h ensures free flow from the adjacent end of the chute, a feature which is also of importance when the receptacle is being discharged.

In some cases the chute f may be dispensed with, the hopper g then discharging at one side directly into the storage chamber. In another arrangement the upper chute b or both the upper and lower chutes b, f may be duplicated, one of the pairs of chutes b, f delivering to one side of the storage chamber and the other pair to the other side. The chutes b would be oppositely inclined, and their upper ends could be arranged adjacent to each other, the two chutes being supplied from the same upper control hopper.

The modification shown in Figures 5–8 is essentially similar to that above described, but in addition the lower part of the upper chute b is provided with a grid i to enable dirt or fine material passing down the chute b to be separated from the main mass of the material before it enters the lower control hopper. The fine material passing through the grid is collected by a chute j and is conducted away through a passage k provided in the hopper g to a discharge chute l. The passage k is enclosed by an inverted V plate m. Material flowing down the chute b passes on to the ridge of the plate m and then down its opposite sides to the lower part of the hopper g.

Figure 9:
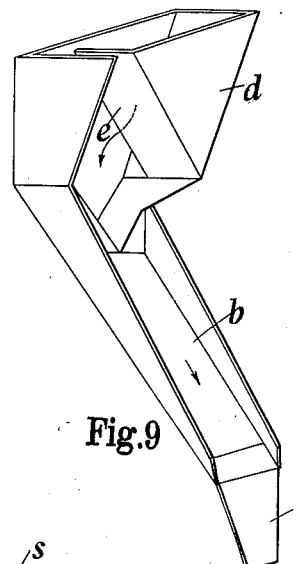
Figure 9 is a perspective view and Figure 10 a plan of a further modified form of chute.

The modified form of chute b and control hopper d shown in Figure 9 is also essentially similar to that shown in the upper part of Figure 1, excepting that the plate e is arranged in contact with one side of the hopper so that material can flow around the other side only, and the lower V portion of the hopper is in line with the direction of the chute b. In other words the chute b is at right angles to the position in Figure 1, and the material flows into the chute from one part only of the hopper.

Figure 10:
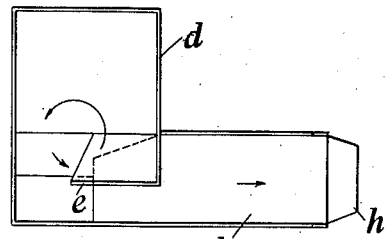
Figure 11:
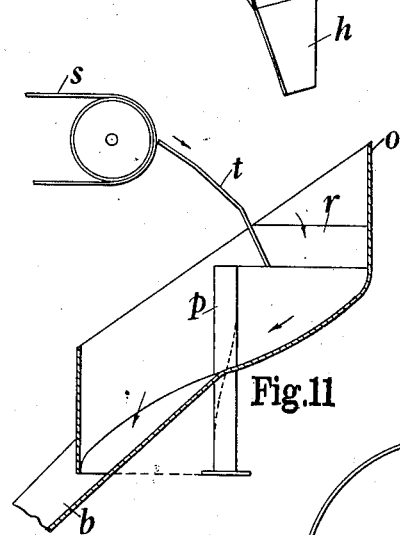
Figures 11, 12 and 13 are respectively sectional side elevation, front elevation and plan of a still further modification.
Figure 12:
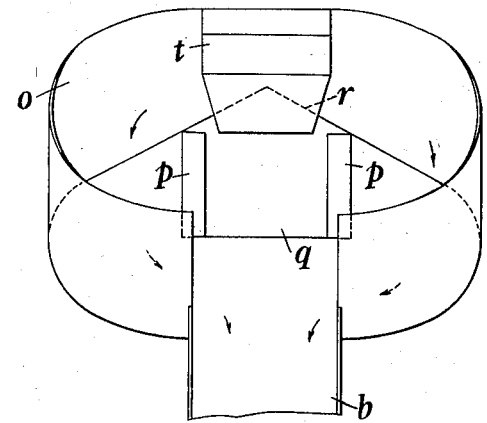
Figure 13:
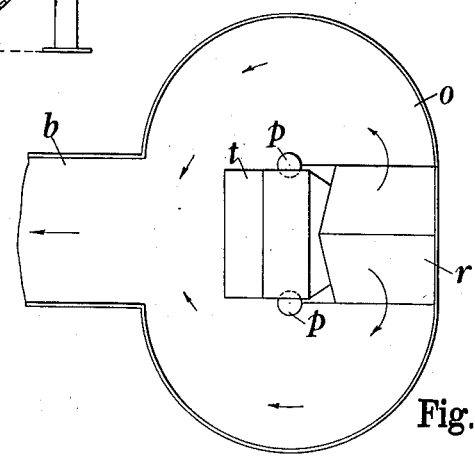

As already mentioned, in the description of Figures 1–4, the material while flowing through the control hopper, moves with a spiral, or vortex like, motion. Whilst well regulated and satisfactory flow of the material has been obtained in apparatus constructed in the manner shown in Figures 1–4 or the modification shown in Figures 5–10, the spiral condition of motion may be accentuated, with possible advantage in some cases, by making the base of the control hopper to a spiral form. This is illustrated diagrammatically in Figures 11–13. The control hopper o is formed with rounded ends, each having its centre at a post p. Between the posts is arranged a partition plate q, and behind this plate is arranged an inverted V shaped partition r. The floor of the hopper on each side of the posts p is made to a helical form. Material is fed from a conveyor s or other means on to a chute t, and from the chute it passes on to the ridge of the partition r. Here it is divided and caused to flow in opposite directions down the two inclined sides of the partition on to the spiral floor of the hopper. After slowly moving around the ends of the hopper the material passes on to the main chute b whence it is discharged either into another and similar control hopper, or directly into the storage chamber. This spiral form of control hopper may also be employed in the side-flow construction shown in Figures 9 and 10.

In a further modification I may make the upper control hopper d separate from the chute b, and mount it on a wheeled carriage so that it can be moved on rails or tracks from one storage chamber to another. This arrangement would avoid the need for providing a control hopper at the upper part of each of a battery of chambers which are required to be filled in succession, and so minimize initial cost.

With apparatus as above described, the conducting of material from the upper to the lower end and middle parts of a deep storage chamber can be readily, conveniently and expeditiously effected with a minimum of breakage or pulverization.

The invention is not limited to the examples above described as subordinate details can be varied to suit different requirements. Also the invention may be used for charging grain and other similar materials into storage receptacles.

Having thus described my invention what I claim as new and desire to secure by Letters Patent is:—

1. In means for charging coal, coke and other solid materials into storage chambers and the like, the combination with the upper end of a delivery chute, of a control hopper having its delivery part contiguous with the said upper end of the chute, and comprising an inclined part over which the material flows during its passage through the hopper to the chute, and flow-impeding means associated with the said inclined part at a position between the entry and delivery parts of the hopper for deflecting the material laterally without causing it to fall freely, substantially as described.

2. In means for charging coal, coke and other solid materials into storage chambers and the like, the combination with a delivery chute, of a control device comprising a hopper, a pair of lower sides inclined towards each other forming a V open at the top, and a partition plate arranged in association with one of the said sides forming with it another V also open at the top, a passage being provided at least at one of the sides of the partition, and a delivery aperture leading to the chute being arranged at the side of the hopper adjacent to the lower V, substantially as described.

3. In means for charging coal, coke and other solid materials into storage chambers and the like, the combination with a delivery chute of a control device in the form of a hopper having a partition therein and provided with a spiral base lying between the entry and delivery parts of the hopper, substantially as described.

4. In means for charging coal, coke and other solid materials into storage chambers and the like, the combination with a delivery chute, of a control device in the form of a hopper having an inverted V arranged at its entry side, an aperture for communicating with the chute at its delivery side, and a pair of spiral base parts lying between opposite sides of the said V and the delivery aperture, substantially as described.

5. In means for charging coal, coke and other solid materials into storage chambers as claimed in claim 1, a control hopper arranged at the lower end of the chute and having a flow-impeding partition forming a continuation of, but arranged at a steeper angle than, the adjacent part of the chute, substantially as described.

EDWIN GEORGE BLACKWELL.